(12) United States Patent
Navarro, Sr.

(10) Patent No.: US 10,717,164 B1
(45) Date of Patent: Jul. 21, 2020

(54) MACHINE TOOL EDGE FINDER APPARATUS AND METHOD

(71) Applicant: Joseph R. Navarro, Sr., Mooresville, NC (US)

(72) Inventor: Joseph R. Navarro, Sr., Mooresville, NC (US)

( * ) Notice: Subject to any disclaimer, the term of this patent is extended or adjusted under 35 U.S.C. 154(b) by 156 days.

(21) Appl. No.: 16/167,097

(22) Filed: Oct. 22, 2018

Related U.S. Application Data

(60) Provisional application No. 62/575,832, filed on Oct. 23, 2017.

(51) Int. Cl.
| | |
|---|---|
| *B23Q 17/22* | (2006.01) |
| *G01B 5/245* | (2006.01) |
| *B23Q 3/18* | (2006.01) |
| *G05B 19/401* | (2006.01) |

(52) U.S. Cl.
CPC ..... *B23Q 17/2225* (2013.01); *B23Q 17/2241* (2013.01); *B23Q 17/2258* (2013.01); *G01B 5/245* (2013.01); *B23Q 3/186* (2013.01); *G05B 19/4015* (2013.01)

(58) Field of Classification Search
CPC . G01B 5/245; G01B 7/31; G01B 7/30; G01B 3/22; G01B 5/25; G01B 7/305; B23Q 17/225; B23Q 17/22; B23Q 1/626; B23Q 39/04; B23Q 3/15526; B23Q 3/15786; B23Q 1/5412; B23Q 15/02
USPC ......................................................... 33/638
See application file for complete search history.

(56) References Cited

U.S. PATENT DOCUMENTS

| | | | | | |
|---|---|---|---|---|---|
| 4,406,069 | A | * | 9/1983 | Clement | G01B 5/245 33/520 |
| 4,437,803 | A | * | 3/1984 | Volna | B23Q 17/2258 33/642 |
| 5,217,336 | A | * | 6/1993 | LeBlanc | B23Q 17/225 33/642 |
| 6,832,440 | B2 | * | 12/2004 | Navarro, Sr. | G01B 5/245 33/626 |
| 7,069,666 | B2 | * | 7/2006 | Navarro | B23Q 17/22 33/626 |
| 8,584,372 | B2 | * | 11/2013 | Stoffel | G01B 5/25 33/628 |
| 10,150,192 | B1 | * | 12/2018 | Navarro, Sr. | B23Q 3/186 |
| 10,150,194 | B1 | * | 12/2018 | Navarro, Sr. | B23Q 17/2275 |
| 2004/0128849 | A1 | * | 7/2004 | Navarro, Sr. | B23Q 17/225 33/638 |
| 2005/0120574 | A1 | * | 6/2005 | Navarro | G01B 5/245 33/638 |
| 2011/0131826 | A1 | * | 6/2011 | Gordon | B23Q 17/2233 33/642 |

* cited by examiner

*Primary Examiner* — Yaritza Guadalupe-McCall
(74) *Attorney, Agent, or Firm* — Robert J. Yarbrough of Lipton, Weinberger & Husick

(57) ABSTRACT

An edge finder to locate a work piece, work-holding feature or cutting tool with respect to the spindle of a machine tool includes a shank, a body and an indicator. When the shank is attached to the machine tool spindle, the longitudinal axis is coextensive with the spindle axis of rotation. The indicator measures the location of a work piece, work-holding feature or cutting tool with respect to the shank longitudinal axis. The indicator is rotatable so that a machinist may read the indicator from any direction.

18 Claims, 13 Drawing Sheets

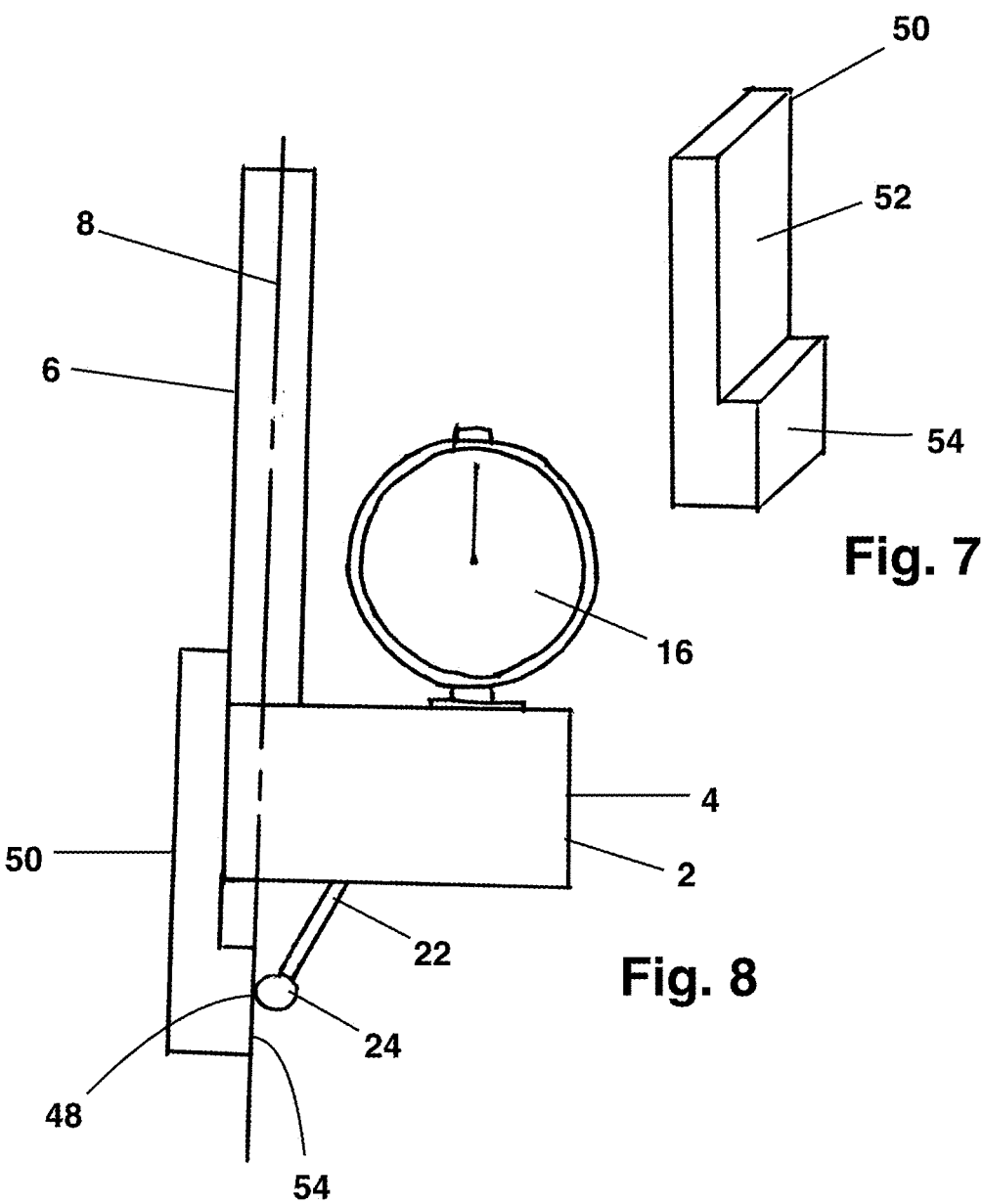

MACHINE TOOL EDGE FINDER APPARATUS AND METHOD

I. BACKGROUND OF THE INVENTION

A. Field of the Invention

The invention is an edge finder and method for orienting a work piece, a work-holding feature, or a cutting tool with respect to the spindle of a machine tool. An example of a machine tool is a milling machine or a lathe. The 'work piece' is the object to be cut using the machine tool.

In the case of a milling machine, a work-holding feature secures the work piece with respect to the spindle of the machine tool. Examples of work-holding features are a table of the machine tool and a vise. A cutting tool is attached to the spindle and rotates with the spindle to cut the work piece. The edge finder of the Invention locates the work-holding feature or the work piece with respect to the spindle of the milling machine.

In the case of a lathe, the work piece is attached to the spindle of the lathe and rotates with the spindle. A cutting tool that is not attached to the spindle cuts the rotating work piece. The edge finder of the Invention locates the cutting tool of the lathe with respect to the lathe spindle or the work piece.

Although this document discusses the edge finder of the Invention in the context of a milling machine having a rotating spindle and a stationary work piece, the Invention applies equally to a lathe having a moving work piece and a stationary cutting tool, or to a machine tool in which both the work piece and the cutting tool move.

B. Statement of the Related Art

As used in this document, machining is the subtractive shaping of a work piece to remove material from the work piece where the relative motion between a cutting tool and the work piece is defined by a machine tool. Accurate machining requires that the machinist accurately align the rotating spindle of the milling machine, which holds the cutting tool, and the work piece.

A milling machine includes a table to which a work piece may be attached. The table is movable in the 'X' and 'Y' directions in an X-Y-Z coordinate system. The spindle is configured for rotation. A milling cutter, such as an end mill, slab mill, side-and-face cutter, involute gear cutter, thread mill, face mill, fly cutter, woodruff cutter, hollow mill, dovetail cutter, or shell mill is attached to the spindle. The spindle and rotating milling cutter are configured to move in the 7' direction. A machinist will bring the rotating milling cutter into contact with the work piece by moving the spindle in the Z direction or by moving the table in the X or Y direction until the rotating milling cutter intersects the work piece, cutting the work piece.

For a vertical milling machine, the movement of the table of the milling machine defines the X and Y-axes of the X-Y-Z coordinate system. The spindle defines the Z-axis and the machine tool is adjustable by the machinist so that the axis of rotation of the spindle is normal to the X and Y-axes defined by the table. The machinist may align the Z-axis to the X and Y-axes of the table using the squaring apparatus and method taught by U.S. Pat. No. 7,069,666 to Joseph Navarro, issued Jul. 4, 2006 and taught by U.S. Pat. No. 6,832,440 to Joseph Navarro, issued Dec. 21, 2004, which patents are incorporated by reference as if set forth in full herein. The squaring apparatus taught by U.S. Pat. Nos. 6,832,440 and 7,069,666 includes a shank that has a longitudinal axis. The shank can be attached to the spindle of the machine tool. A squaring apparatus body is attached to the shank. The squaring apparatus body supports two indicators in a spaced apart relation on either side of the longitudinal axis of the shank. The plungers of the two indicators are movable parallel to the longitudinal axis of the shank. After the two indicators are calibrated, the shank is attached to the spindle, the spindle is rotated until the spaced apart indicators are oriented along the X-axis, and the spindle is advanced until the plungers contact the table of the machine tool. The table is adjusted until both indicators have the same reading. The process is repeated for the Y-axis, squaring the table with respect to the spindle.

The machinist also must align the work piece with respect to the table so that when the table is moved along the X-axis or the Y-axis, the work piece moves in the desired orientation with respect to the milling cutter. Otherwise, the cuts made by the milling cutter will be in the wrong location on the work piece. One way to align the work piece and the spindle is to align the vise or other work-holding feature to the spindle using an edge finder. Once the spindle is aligned to the table and aligned with the work piece, the machinist must accurately locate the spindle with respect to the work piece using an edge finder.

The prior art does not teach the apparatus or method of the invention.

II. BRIEF DESCRIPTION OF THE INVENTION

The edge finder of the Invention has a shank with a shank longitudinal axis supporting a body. The shank longitudinal axis is coextensive with the axis of rotation of the spindle when the shank is mounted to the spindle. An indicator, which may be a dial indicator, is attached to the body and has a plunger having an axis of travel that is parallel to the shank longitudinal axis. The indicator may be attached to the body by a bearing such as a ball bearing and may be configured for rotation about the plunger axis of travel. The swiveling nature of the dial indicator allows a machinist to turn the face of the dial indicator in any direction. The machinist can read the face of the dial indicator from a single location for any orientation of the body of the edge finder and without the parallax resulting from reading the dial indicator from an oblique angle. The bearing is pre-loaded so that the indicator does not have detectable end play or lateral play with respect to the body.

A lever is connected to the body by a hinge about which the lever can move in a rocking movement. The lever bears upon the plunger of the indicator so that the indicator detects the rocking movement of the lever about the hinge. The lever also is attached to a probe shaft that depends from the body. A locator probe is attached to the probe shaft. The contact location of the locator probe is configured to intercept the longitudinal axis of the shank when the indicator has a selected reading. For example, the indicator may be calibrated to read 'zero' when the probe contact location intercepts the longitudinal axis of the shank.

The longitudinal axis of the shank and the indicator axis of travel together define a reference plane. The axis of rotation of the lever about the hinge is normal to the reference plane.

The machinist may calibrate the edge finder using a calibration tool. The calibration tool has a reference surface that is configured to engage the body or shank of the edge finder and a calibration surface that is configured to engage the locator probe contact location and to hold the contact location so that the contact location intercepts the shank longitudinal axis. The machinist will hold the calibration tool against the body or shank of the edge finder and the locator probe. The machinist will then either zero the indicator or select or note another calibration value corresponding to the interception of the shank longitudinal axis by the locator probe contact location. The edge finder then is calibrated and ready for use.

To use the edge finder of the invention to align a vise to the spindle of a vertical milling machine, the machinist will install the edge finder on the spindle so that the spindle axis of rotation and the shank longitudinal axis are coextensive. A collet or chuck, a known in the art, is suitable for attaching the shank to the spindle. The machinist will orient the calibrated edge finder so that a reference plane, defined by the shank longitudinal axis and the plunger axis of travel, is oriented normal to the desired orientation of the stationary jaw of the vise. The machinist will move the table and the spindle so that the probe contact location is in contact with the face of the stationary jaw of the vise and the indicator reads zero or any other number corresponding to the location of the spindle axis of rotation. The machinist then will move the table of the milling machine so that the probe contact location moves along the face of the stationary jaw of the vise normal to the reference plane. Any misalignment of the face of the stationary jaw of the vise and the spindle axis of rotation registers as movement of the pointer of the dial indicator. The machinist will correct the alignment of the vise and repeat the process.

To locate the spindle of the machine tool with respect to the work piece, the machinist will clamp the work piece in the vise that has been aligned as described above. The shank of the edge finder is attached to the spindle, as described above. The spindle of the machine tool is rotated so that the edge of the work piece is normal to the reference plane on the opposite side of the shank longitudinal axis from the plunger axis of travel. The hinge axis of rotation is oriented generally parallel to the edge of the work piece and the direction of movement of the locator probe about the hinge then is generally normal to the edge of the work piece. The machinist will move the table and spindle of the vertical milling machine until the contact location of the probe contacts the work piece and the dial indicator reads zero or any other value corresponding to the location of the spindle axis of rotation. The machinist may rotate the face of the indicator to better read the calibrated value without parallax. The spindle axis of rotation and the work piece edge are now accurately located with respect to each other in preparation for machining. The machinist is now ready to begin machining operations.

The edge finder of the Invention may dispense with the lever to translate the motion of the locator probe to the motion of the indicator. The edge finder may include a sliding inclined plane or cam, referred to herein as a 'slider.' The slider is trapped by the body and is configured to slide toward or away from the longitudinal axis of the shank. The locator probe is attached to the slider through the probe shaft. The slider moves along its path of movement by a force applied to the slider by the locator probe when the locator probe contacts the work piece. The contact surface of the slider that engages the indicator plunger may have any suitable configuration and may be straight or curved. A contact surface that defines an angle of 45 degrees to the shank longitudinal axis is believed to be suitable, but the contact surface may define any angle other than 90 degrees to the shank longitudinal axis. As the slider moves along its path of motion, the surface of the slider contacts the indicator plunger, causing the indicator to exhibit a reading. The indicator may be selected so that the indicator displays one unit of measurement (say, ¹⁄₁₀₀₀ of an inch) for every one unit of measurement of movement of the probe tip.

The edge finder may incorporate the apparatus for squaring the table of the machine tool with respect to the spindle of the machine tool taught by U.S. Pat. Nos. 7,069,666 and 6,832,440, both to Joseph Navarro and incorporated by reference. The apparatus for squaring the table of the machine tool to the spindle and addresses by the above patents is hereinafter referred to as the 'squaring apparatus.'

The edge finder may be an attachment to the squaring apparatus. A body defines a top portion and a bottom portion. The top portion of the body is releasably and repeatably attachable to the squaring apparatus. The bottom portion of the body extends below the squaring apparatus body. A lever is rotatably attached to the bottom portion of the body and is configured to pivot about a hinge axis of rotation normal to a reference plane defined by the shank longitudinal axis and by the axes of travel of one of the plungers. A locator probe depends from the lever. The locator probe defines a locator probe contact location that moves as the lever pivots in the reference plane. The probe contact location defines an arc as the lever pivots in the reference plane. The arc intercepts the shank longitudinal axis when the lever is in a calibration position. One of the indicator plungers contacts the lever when the lever is in the calibration position.

The body defines a body calibration surface and the lever defines a lever calibration surface. When the lever is in the calibration position, the body calibration surface and the lever calibration surface simultaneously conform to a reference calibration surface. The lever calibration surface, body calibration surface, and reference calibration surfaces all may be planar. Alternatively, the calibration surfaces may be of any suitable shape, including circular, angular, or any other desired shape.

To calibrate the edge finder of the invention, a machinist will hold the body calibration surface and lever calibration surfaces against the reference calibration surface. The reference calibration surface will move the lever to the calibration position. The machinist will then zero the indicator that is in contact with the lever, calibrating the edge finder. The body and lever of the invention may be attached to the squaring apparatus and calibrated while the squaring apparatus is attached to the spindle of the machine tool and without removing the squaring apparatus from the spindle of the machine tool.

The body may be selectably and repeatably connected to the squaring apparatus by any suitable mechanism. For example, two pins may be attached to the body and an eccentric cam clamp may be disposed on the body between the two pins and far enough away from the pins that the shank of the squaring apparatus will fit between the pins and the eccentric cam clamp. Turning the eccentric cam clamp repeatably attaches and detaches the edge finder from the squaring apparatus. Any other suitable mechanism may be used. For example, the body may connect to the squaring apparatus body by one or more pins, bolts, screws, by a dovetail connection, by a threaded connection between the body and the squaring apparatus, and by any mechanism known in the machining art to repeatably and releasably attach one object to another.

The edge finder of the Invention allows a machinist to locate the axis of rotation of the spindle of the machine tool with respect to the work piece. The Invention allows a machinist to quickly and easily set up a work piece and machine tool for accurate machining of the work piece.

III. Brief Description of the Drawings

FIG. 7 is a perspective view of a calibration tool for the edge finder.

FIG. 8 is a side view of the edge finder and calibration tool during calibration.

IV. DESCRIPTION OF AN EMBODIMENT

Figure 1:
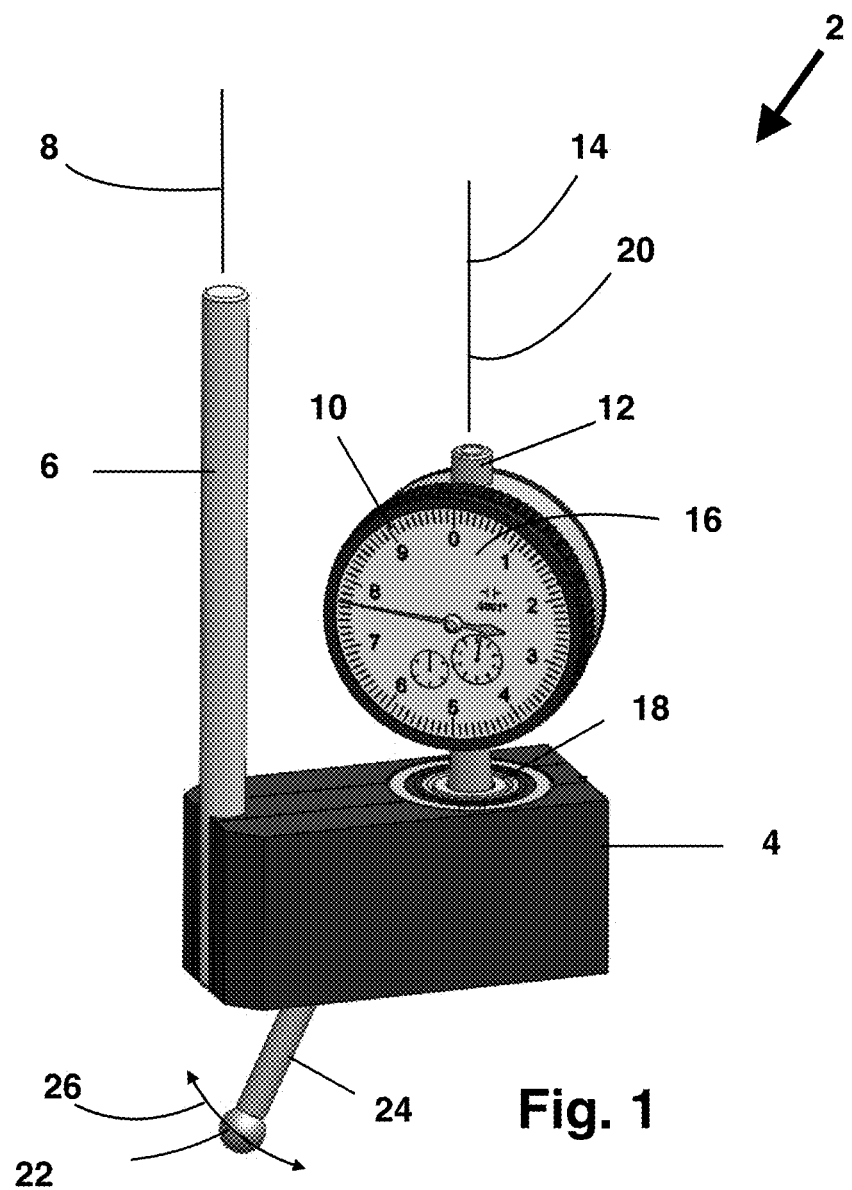
FIG. 1 is a perspective view of a first side of the edge finder.
Figure 2:
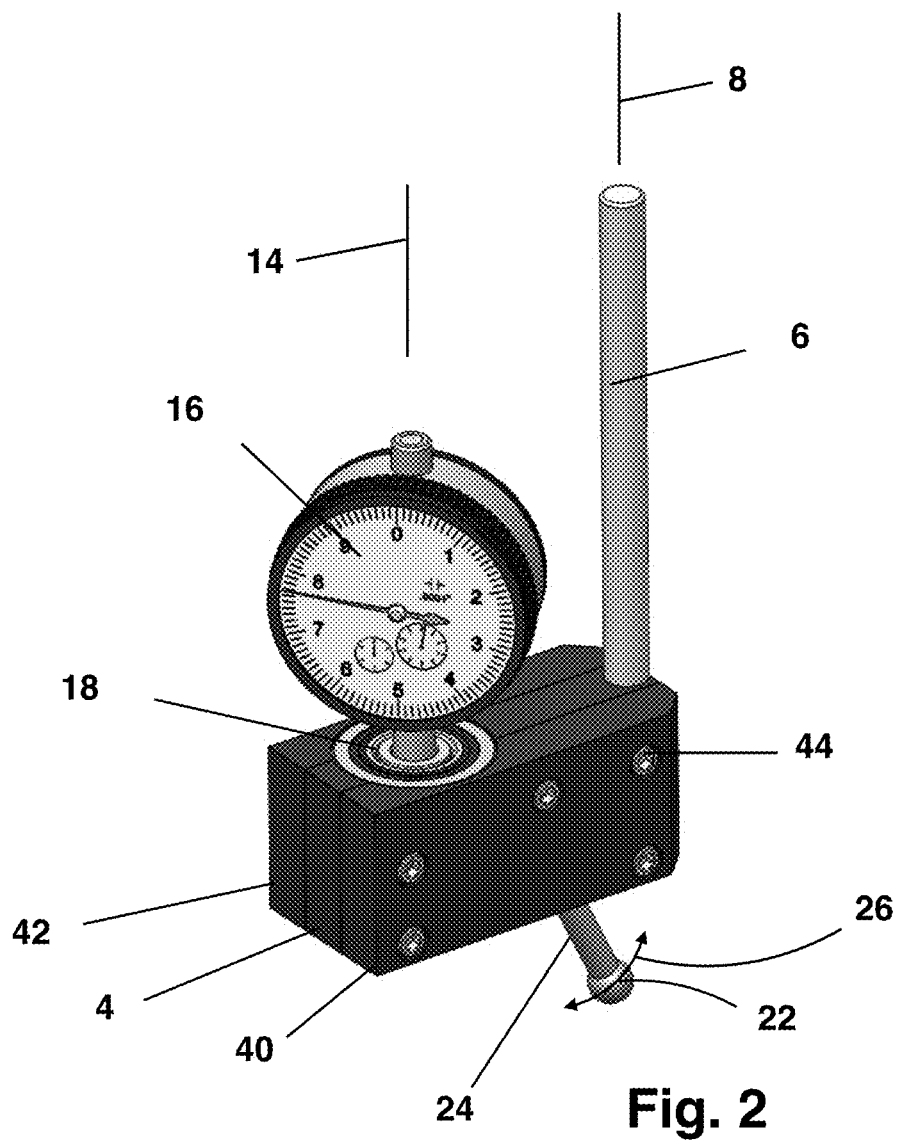
FIG. 2 is a perspective view of a second side of the edge finder.
Figure 3:
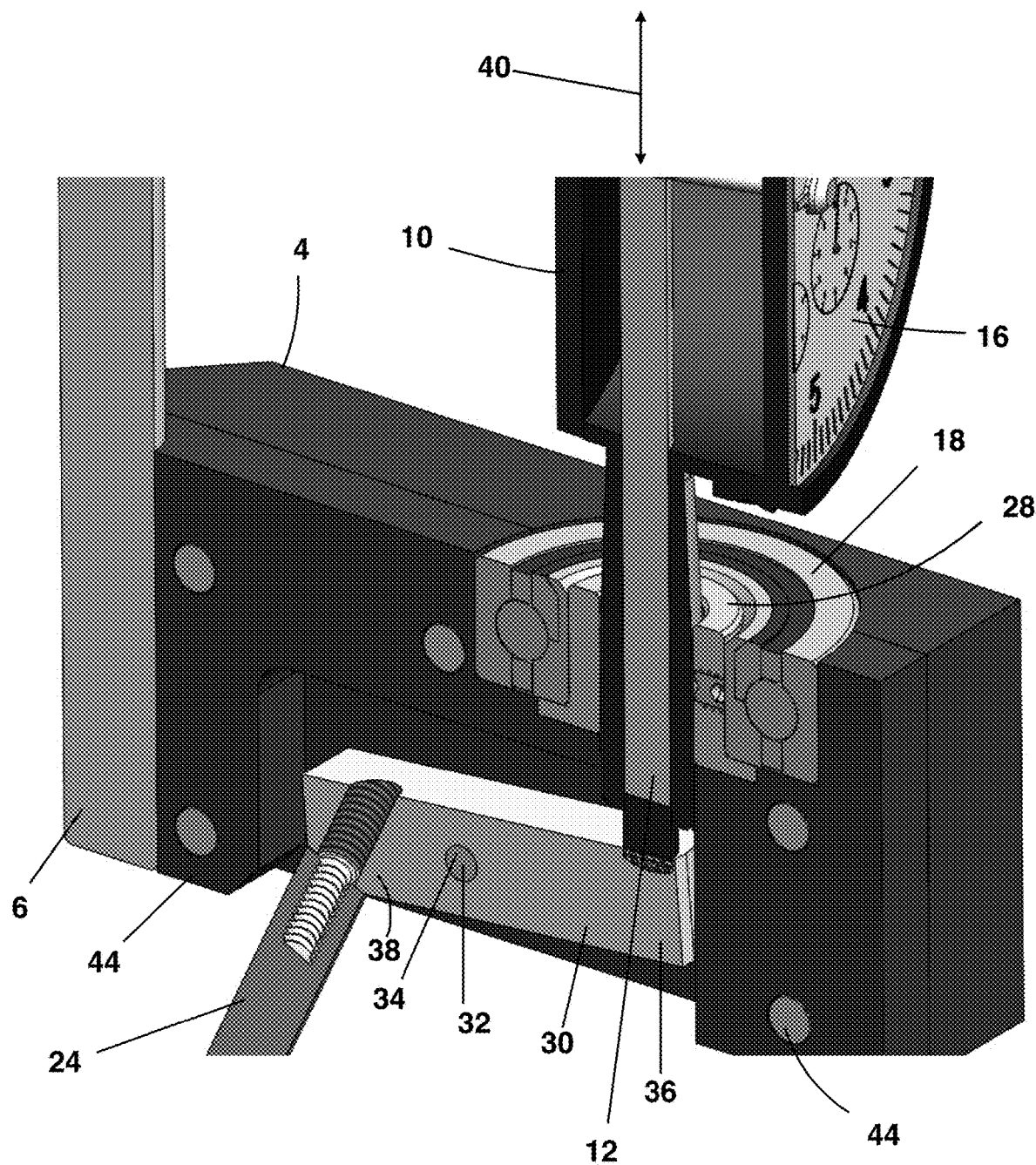
FIG. 3 is a detail cutaway of the edge finder.
Figure 4:
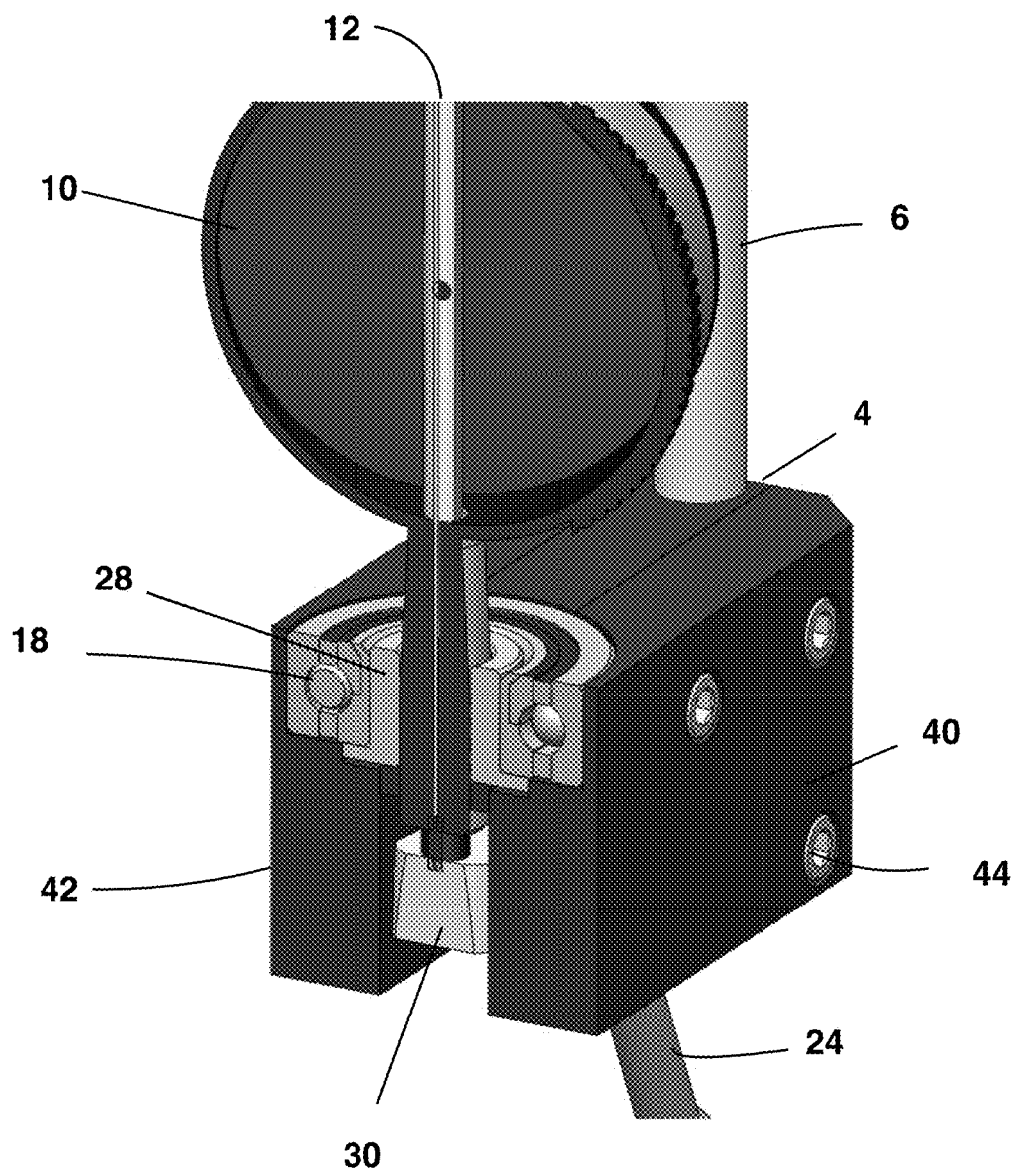
FIG. 4 is a second detail cutaway of the edge finder.
Figure 5:
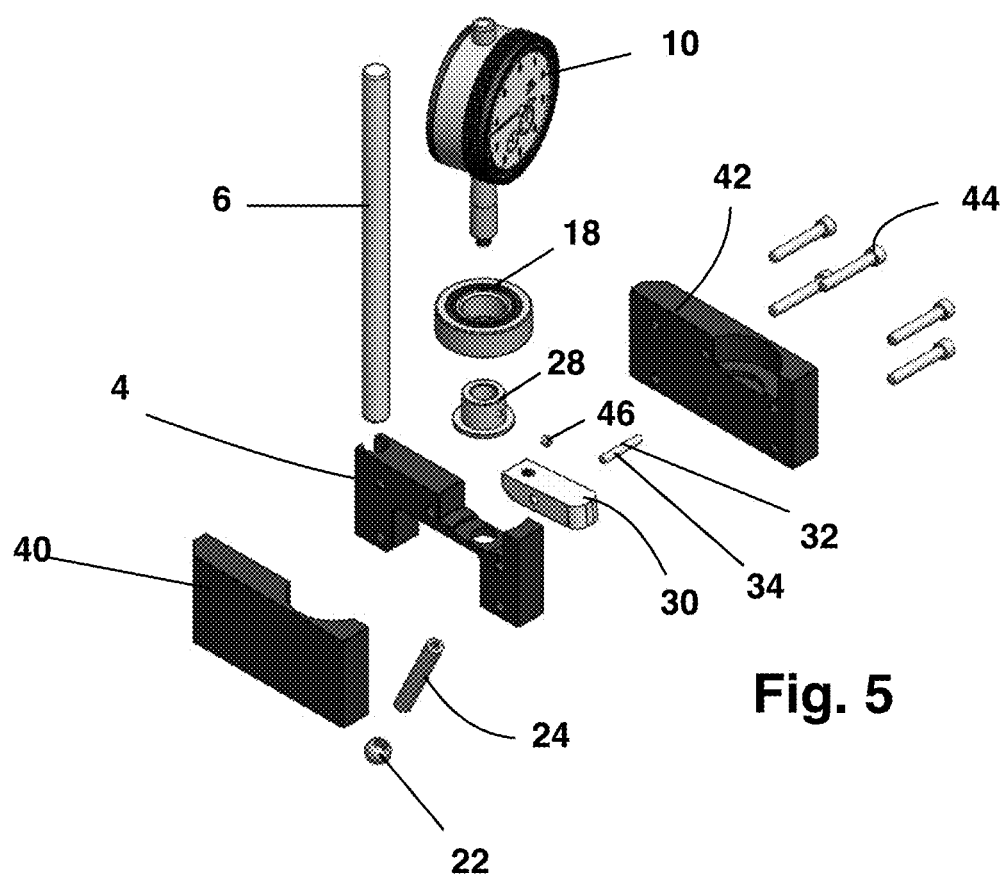
FIG. 5 is an exploded view of the edge finder.
Figure 6:
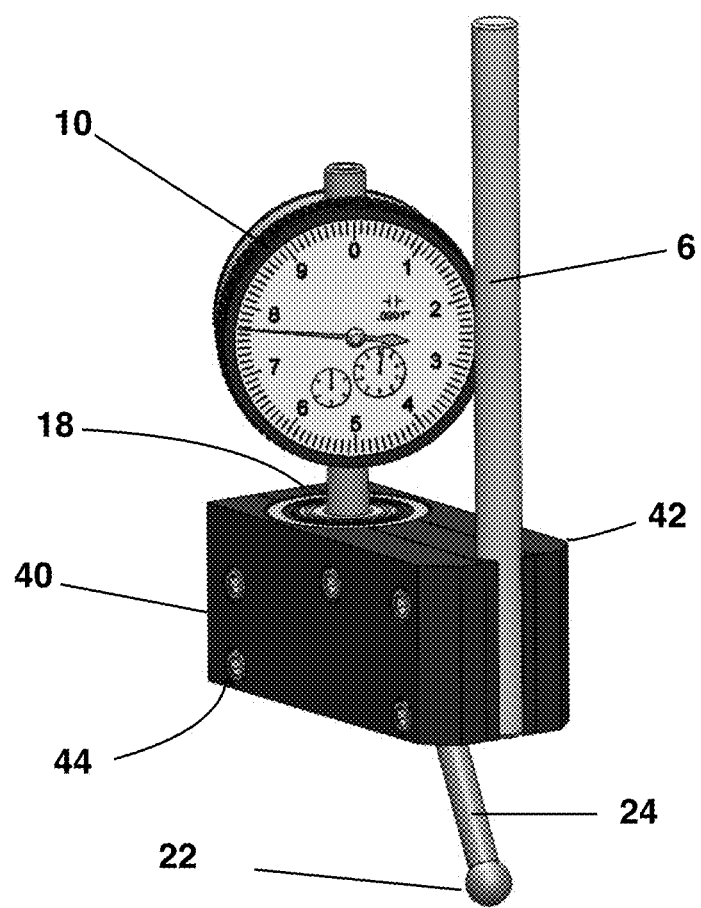
FIG. 6 is a perspective front view of the edge finder.

FIGS. 1 through 6 illustrate the edge finder 2. FIGS. 1 and 2 are perspective views opposing sides of the edge finder 2. FIGS. 3 and 4 are detail cutaway views of edge finder 2. FIG. 5 is an exploded view of the edge finder 2. FIG. 6 is a perspective view of the rear of the edge finder 2. FIG. 7 is a perspective view of an edge finder calibration tool and FIG. 8 shows the calibration tool in use.

From FIGS. 1 and 2, a body 4 is attached to a shank 6. The shank 6 can be selectably attached to the spindle of a machine tool so that the shank longitudinal axis 8 is coextensive with the axis of rotation of the spindle. When the shank 8 is attached to the spindle, the shank 6 can rotate with the spindle about the shank longitudinal axis 8.

An indicator 10 is attached to and supported by the body 4. The indicator 10 features a plunger 12 that has a plunger axis of travel 14. The indicator face 16 indicates a movement of the plunger 12 along the plunger axis of travel 14 in the axial direction. The indicator 10 is mounted to the body 4 by a bearing 18. The bearing 18 allows the indicator 10, and hence the indicator face 16, to rotate about an indicator axis of rotation 20, which may be coextensive with the plunger axis of travel 14. The bearing 18 allows a user to rotate the indicator face 16 when the shank 6 is attached to the spindle of the machine tool so that the indicator face 16 is directed toward the user. The user is not required to change his or her position to avoid parallax and to accurately read the indicator face 16. FIGS. 1 and 2 show the indicator rotated to different directions, showing that the user can read the indicator face 16 regardless of the orientation of the body 4 when the shank 6 is attached to the spindle of the machine tool.

Also from FIGS. 1 and 2, a locator probe 22 is attached to the end of a probe shaft 24. The locator probe 22 and probe shaft 24 depend from the body 4. The locator probe 22 and probe shaft 24 are configured to move in an arc 26 and in turn move the plunger 12 along the plunger axis of travel 14. The shank longitudinal axis 8 and the plunger axis of travel 14 are parallel and together define a mathematical reference plane. The arc 26 is disposed on the reference plane.

FIGS. 3 and 4 are detail cutaway views showing the mechanism of the locator probe 22 and probe shaft 24 and also showing the bearing 18. The bearing 18 is preloaded to prevent detectable axial or lateral movement of the indicator 10 and to provide an accurate reading by the indicator 10. Body 4 retains the bearing 18. The indicator 10 may be attached to the bearing 18 by a bushing 28.

Also from FIG. 3, a lever 30 is attached to the body 4 by a hinge 32. A hinge pin 34 defines the hinge 32. The lever 30 can rock about the hinge 32. The lever 30 has a first end 36 and a second end 38. The first end 36 bears upon the plunger 12, so that when the lever rocks about the hinge 32 the lever displaces the plunger 12 in the axial direction as indicated by arrow 40 on FIG. 3 and the indicator face 16 registers the displacement. The second end of the lever 30 defines the probe shaft 24 and the locator probe 22. When the lever 30 moves through is range of travel about the hinge 32, the locator probe move through arc 26. The hinge 32 defines a lever axis of rotation that is orthogonal to the reference plane defined by the parallel shank longitudinal axis 8 and the indicator axis of travel 14.

FIG. 4 is a perspective rear cutaway view of the edge finder 2 showing the bearing 18, the bushing 28 connecting the plunger 12 to the bearing 18 and the lever 30 acting on the plunger 12

As shown by the exploded view of FIG. 5, the body 4 is sandwiched between the first side 40 and the second side 42. Fasteners 44, which may be bolts or machine screws, clamp the first and second sides 40, 42 together and around the body 4. The clamping action of the first and second sides 40, 42 also may clamp body 4 to shank 6. The indicator 10 is secured to bushing 28 by a setscrew 46. The bushing 28 is secured to a bearing 18, which may be a ball bearing. Bearing 18 is secured to body 4 between first and second sides 40, 42. Bearing 18 allows indicator 10 to rotate with respect to body 4 and shank 6 generally about the axis of travel 14 of the indicator 10. Bearing 18 is pre-loaded to avoid endplay or lateral play in the bearing 18 that would affect the accuracy of the readings of the indicator 10.

From FIG. 5, a hinge pin 34 defines hinge 32 and defines a lever axis of rotation that is normal to the reference plane. Hinge pin 34 has a pin first end and a pin second end, the pin first and second ends being trapped by the attachment of the first and second sides 40, 42 to the body 4.

The rotatable indicator 10 allows a machinist to orient the spindle of the machine tool in any direction while the shank 6 is attached to the spindle and allows the user to orient the indicator face 16 so that the user can read the indicator 10 without parallax for any orientation of the machine tool spindle. FIGS. 1-4 and 6 illustrate the rotatable indicator 10 with the indicator face 16 in different orientations.

Also as shown by FIGS. 3, 4 and 5, a probe shaft 24 is attached to the end of the lever 30 and a locator probe 22 is attached to the probe shaft 24. The probe shaft 24 and locator probe 22 therefore are part of the lever 30. When the locator probe 22 moves along the arc 26 in a direction generally normal to the shank longitudinal axis 26, the locator probe 22 moves the probe shaft 24, which causes the lever 30 to rock about hinge 43 and to bear upon the plunger 12, which changes the reading of indicator face 16.

FIGS. 7 and 8 address the calibration of the edge finder 2 using a dedicated calibration tool 50. The indicator face 16 is calibrated to read 'zero,' or some other pre-selected calibration value when the locator probe contact location 48, shown by FIG. 8, intercepts the shank longitudinal axis 8. The calibration tool 50 defines a reference surface 52 and a calibration surface 54. The reference surface 52 is configured to engage a corresponding surface on the edge finder 3. The corresponding surface may be the surface of the shank 6 or may be a surface defined by the body 4. The calibration surface 54 and reference surface 52 are located so that when the reference surface 52 engages the corresponding surface on the edge finder 2, the calibration surface 54 will intercept the probe shaft 24 so that the locator probe contact location 48 is located on the shank longitudinal axis 8.

To calibrate the edge finder 2, the machinist will manually hold the calibration tool 50 so that the reference surface 52 contacts the corresponding surface of the edge finder 2. The calibration surface 54 will contact the probe shaft 24 and push the contact location 48 so that the contact location falls on the shank longitudinal axis 8. The machinist then will zero the indicator 10, completing the calibration. The edge finder 2 is then ready for use.

To use the calibrated edge finder 3 to locate the edge of a work piece with respect to the spindle of a machine tool, the machinist first attaches the work piece to a work-holding feature of the machine tool, such as a vise, table or fixture. The shank 6 is secured to the spindle, as by a collet or chuck, so that the shank longitudinal axis 8 is coextensive with the spindle axis of rotation. The body 4 is oriented by rotating the spindle so that the work piece edge is disposed orthogonal to the reference plane defined by the spindle longitudinal axis 8 and the plunger axis of travel 14. The work piece edge is also located to be on the opposite side of the shank longitudinal axis 8 from the plunger axis of travel 14. In that orientation, the edge to be located is oriented generally parallel to the hinge axis of rotation.

The work piece is advanced laterally toward the machine tool spindle (or the spindle is advanced laterally toward the work piece) until the locator probe contact location 48 contacts the work piece and the indicator reads 'zero' or other pre-selected calibration value. The work piece edge now intercepts the spindle axis of rotation and edge location is complete. The machinist is ready to machine the work piece.

Figure 9:
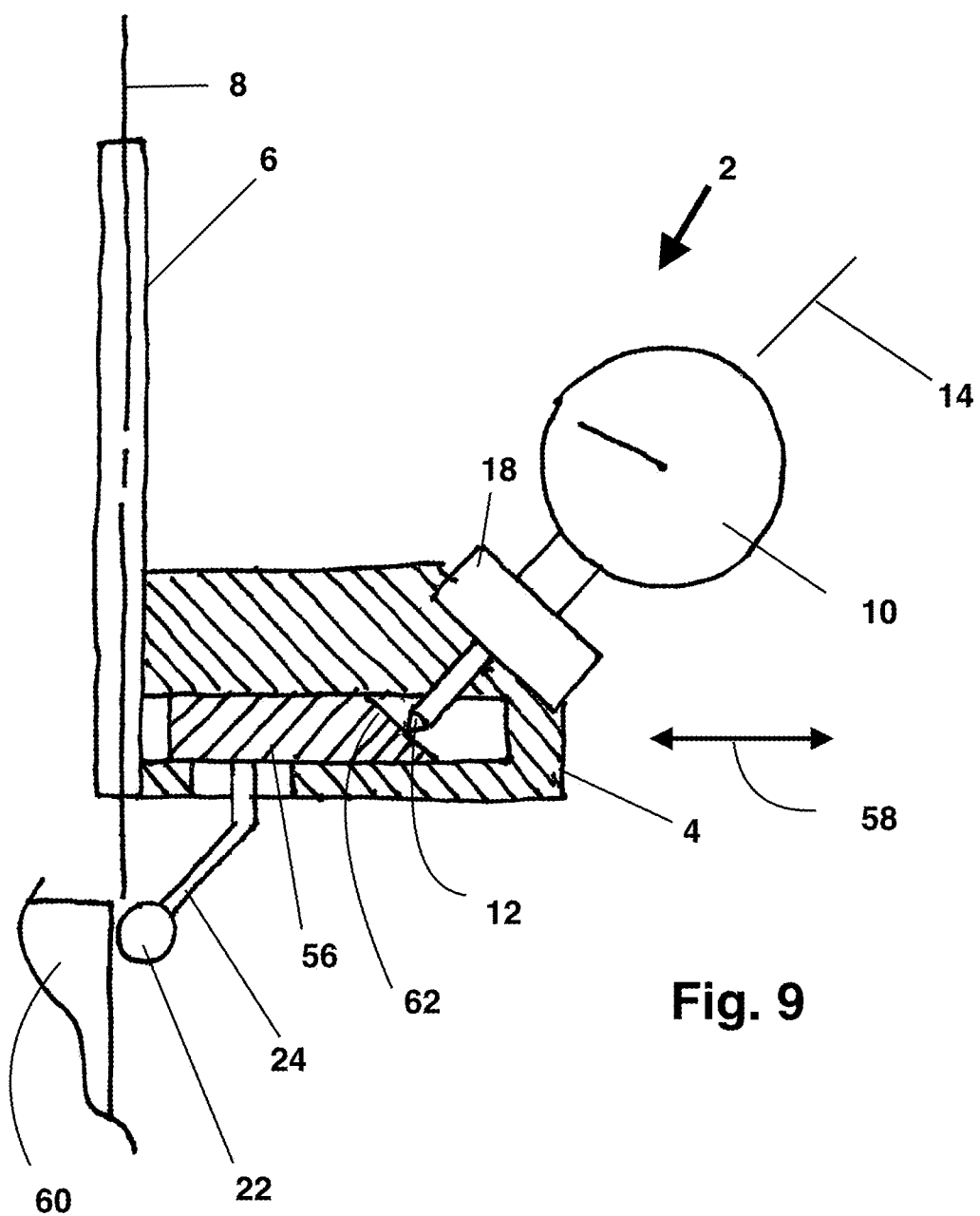
FIG. 9 is a section view of the edge finder that does not use a lever.

FIG. 9 illustrates that the edge detector 2 may dispense with the lever 30. The shank 6 has a shank longitudinal axis 8. Body 4 is attached to the shank 6. A slider 56 is trapped by body 4 and has a line of travel 68 toward and away from the shank longitudinal axis 8 along the reference plane defined by the shank longitudinal axis 8 and the plunger axis of travel 14. The locator probe 22 and probe shaft 24 are attached to the slider 56 and cause the slider 56 to move in its line of travel 58 when the locator probe 22 contacts the work piece 60. The slider 56 defines a slider contact surface 62. When the slider contact surface 62 contacts the plunger 12, the plunger 12 moves and the indicator 10 displays a measurement. The edge finder 2 is configured so that the indicator 10 reads a predetermined value, such as zero, when locator probe 22, and hence the edge of the work piece 60, are aligned with the shank longitudinal axis 8. The indicator 10 is attached to the body 4 by bearings 18 that allow the indicator 10 to swivel. The swiveling indicator 10 allows the machinist to read the indicator 10 from directly in front of the indicator 10 and thus without the confounding effects of parallax.

Configuring the edge finder 2 so that the contact surface 62 contacts the plunger 12 of the indicator 10 when the longitudinal axis 8 of the shank 6 is about $^{30}/_{1000}$ths of an inch away from the edge of the work piece 60 is believed to be suitable in practice. The edge finder 2 is configured so that the indicator 10 reads 'zero' or another pre-determined value when the edge of the locator probe 22 in contact with the work piece 60 is aligned with the shank longitudinal axis 8.

FIGS. 10 through 14 illustrate the edge finder 2 incorporating a squaring apparatus 64 as described by U.S. Pat. Nos. 7,069,666 and 6,832,440, which patents are incorporated by reference. The squaring apparatus is capable of squaring the spindle of the machine tool to the table of the machine tool, as described in the documents incorporated by reference. FIGS. 10 through 14 illustrate another use for the squaring apparatus 64.

Figure 10:
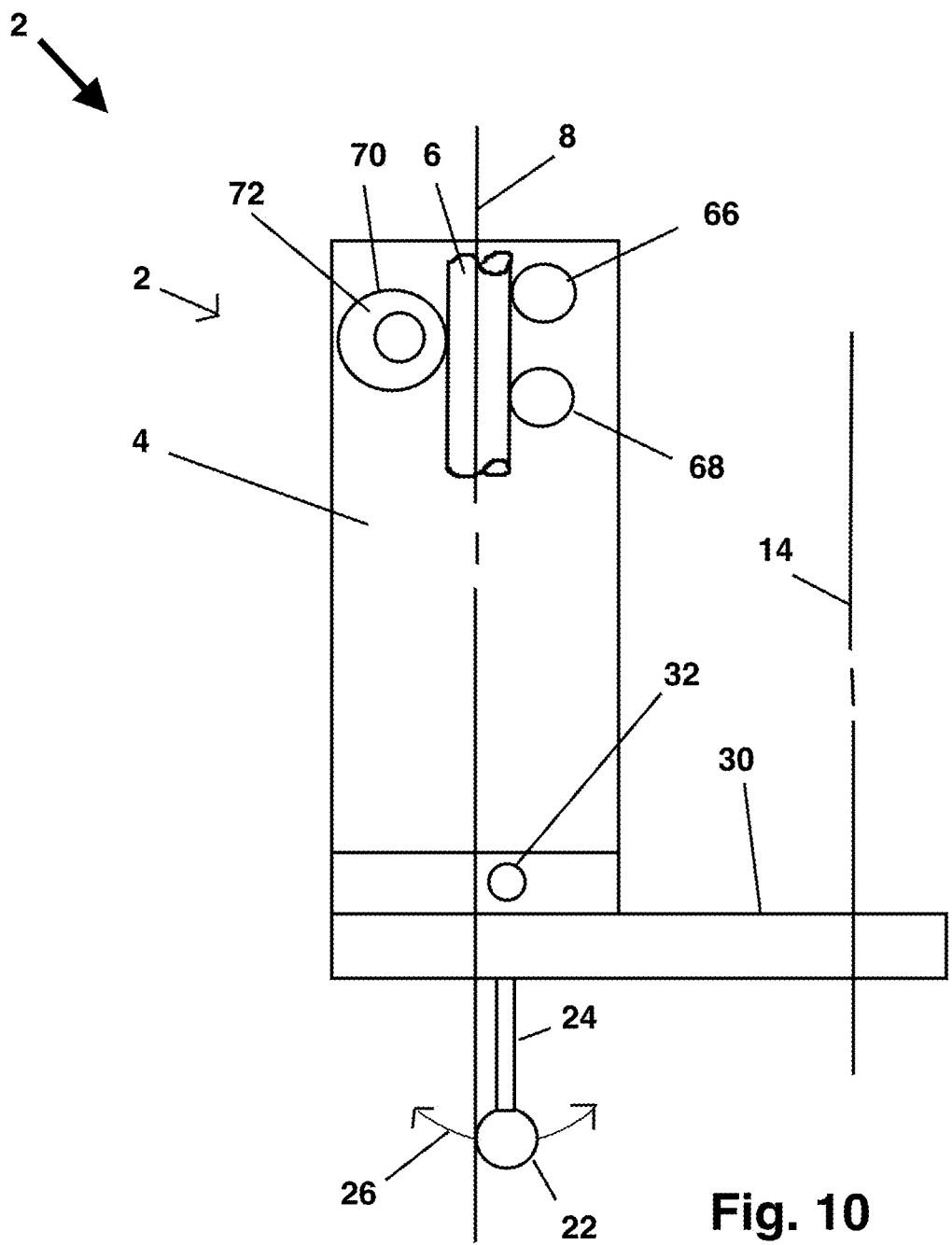
FIG. 10 is a front view of an edge finder for use with the squaring apparatus.

FIG. 10 is a front view of an edge finder 2 without the squaring apparatus 64 attached. The edge finder 2 has a body 4. Attached to the body 4 are a first locating pin 66 and a second locating pin 68. The first and second locating pins 66, 68 are parallel and spaced apart. A cam clamp 70 is attached to the body 4 between the first and second locating pins 66, 68. The first and second locating pins 66, 68 and cam clamp 70 in combination are configured to secure the body 4 to the shank 6 of the squaring apparatus 64. A cut away portion of the shank 6 is illustrated by FIG. 10, which shows the engagement of the first and second pins 66, 68, cam clamp 70 and the shank 6. The cam clamp 70 is disposed on the opposite side of the shank 6 from the first and second locating pins 66, 68. The cam clamp 70 includes an eccentric 72. Rotation of the eccentric 72 clamps the shank 6 between the cam clamp 70 and the first and second locating pins 66, 68. Because of the hardened nature of the shank 6 and the locating pins 66 and 68, the location of the shank 6 and hence the squaring apparatus 64 is accurate and repeatable when the body 4 is attached to the shank 6.

Also as shown by FIG. 10, a lever 30 is rotatably attached to the body 4. The lever 30 pivots about hinge 32 in a rocking motion. Hinge 32 may be a pin connection, a bolt, or any other rotatable connection with suitable accuracy and repeatability to calibrate a machine tool and to locate a work piece. A locator probe 22 depends from the lever 30 by a probe shaft 24. The lever 30, locator probe 22 and probe shaft 24 can pivot about hinge 32 along arc 24.

Figure 11:
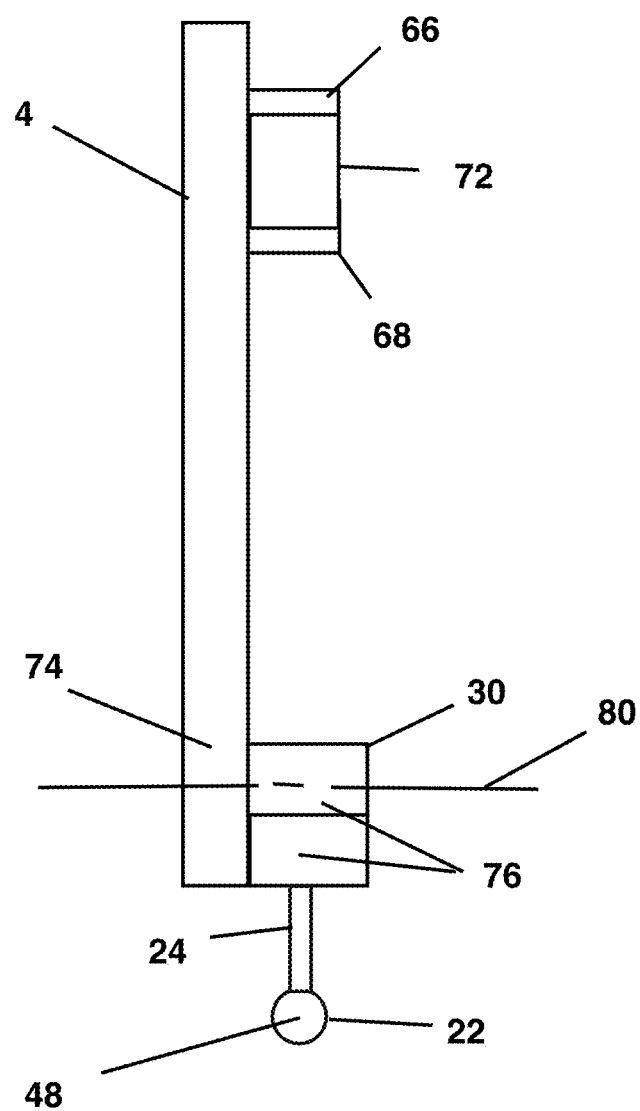
FIG. 11 is a side view of the edge finder for use with the squaring apparatus.

FIG. 11 is a side view of the edge finder 2 when the edge finder 2 is not attached to a squaring apparatus 64. The locating pins 6 and 8 are parallel. The cam clamp 70 is disposed between the first and second locating pins 66, 68. The lever 30, locator probe 22 and probe shaft 24 pivot about hinge axis of rotation 34. The locator probe 22 defines a locator probe contact location 48. The locator probe contact location 48 is the location on the locator probe 22 that will contact a work piece or work-holding feature when the squaring apparatus 64 is attached to the spindle of the machine tool, the edge finder 2 is attached to the shank 6 of the squaring apparatus 64 and the machinist brings the locator probe 22 into contact with the work piece or work-holding feature by moving the work piece or work-holding feature relative to the spindle of the machine tool in a direction normal to the hinge axis of rotation 34. The locator probe contact location 48 moves along arc 26 (shown by FIGS. 10 and 12) as the lever 30 pivots about hinge 32.

Figure 12:
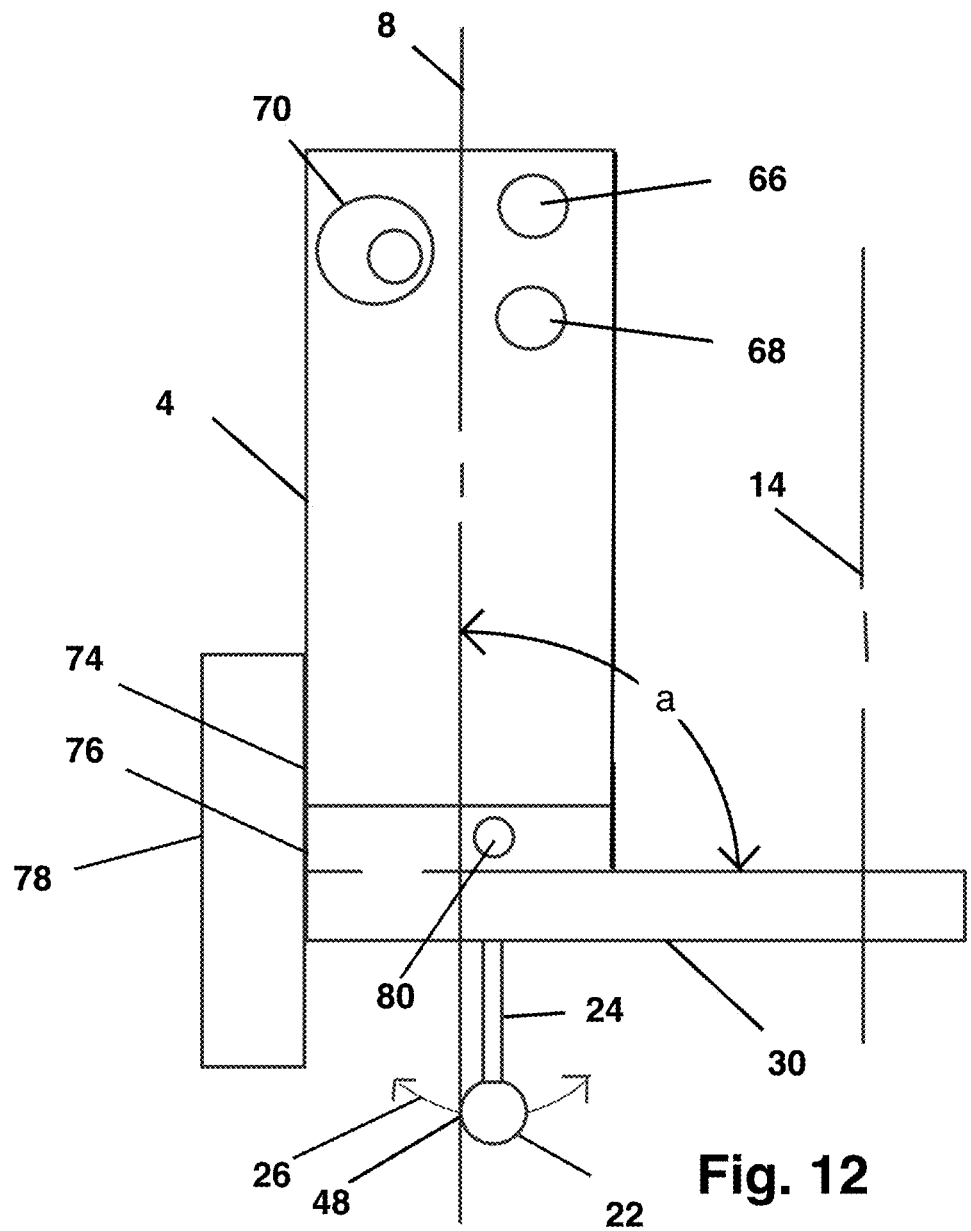
FIG. 12 is a front view of the edge finder with a reference surface for calibration.

FIG. 12 illustrates calibration of the edge finder 2 of FIGS. 10-14. The body 4 defines a body calibration surface 74 and the lever 30 defines a lever calibration surface 76. The body 4 and lever 30 are configured so that when the body 4 is attached to the shank 6 of the squaring apparatus 64 and the body calibration surface 74 and the lever calibration surface 76 both conform to a reference calibration tool 78, the arc 24 defined by the pivoting of the locator probe contact location 48 intercepts the longitudinal axis 26 of the shank 6.

To calibrate the edge finder 2 the machinist first attaches the shank 6 of the squaring apparatus 64 to the body 4 of the edge finder 2, as shown below for FIGS. 13 and 14. The machinist places the reference calibration tool 78 simultaneously against the body calibration surface 74 and the lever calibration surface 76, so that the body calibration surface 74 and the lever calibration surface 76 both conform to the reference calibration tool 78. The lever 30 acts upon one of the two plungers 12 of the two indicators 10 of the squaring apparatus 64, moving the plunger 12 along the plunger axis of travel 14. The machinists will then 'zero' the indicator 10, so that the indicator face 16 reads zero (or some other desired reading) when the body calibration surface 74 and the lever calibration surface 76 both conform to the reference calibration tool 78. The edge finder 2 is now calibrated and ready to find an edge. The calibration tool 78 may be any suitable shape and may be planar.

Once the edge finder 2 is calibrated, the locator probe contact location 48 intercepts the shank longitudinal axis 8, and hence the longitudinal axis of the spindle of the machine tool, whenever the indicator face 16 reads 'zero' or any other selected calibration value. The machinist is then able to align the edge of the work piece or work-holding feature to the spindle axis of rotation by advancing the table of the machine tool until the locator probe contact location 48 is in contact with the work piece or work-holding feature and the reading of the indicator face 16 is zero (or other arbitrary reading). The edge is now located with respect to the spindle axis of rotation and the machinist can proceed with machining operations.

Figure 13:
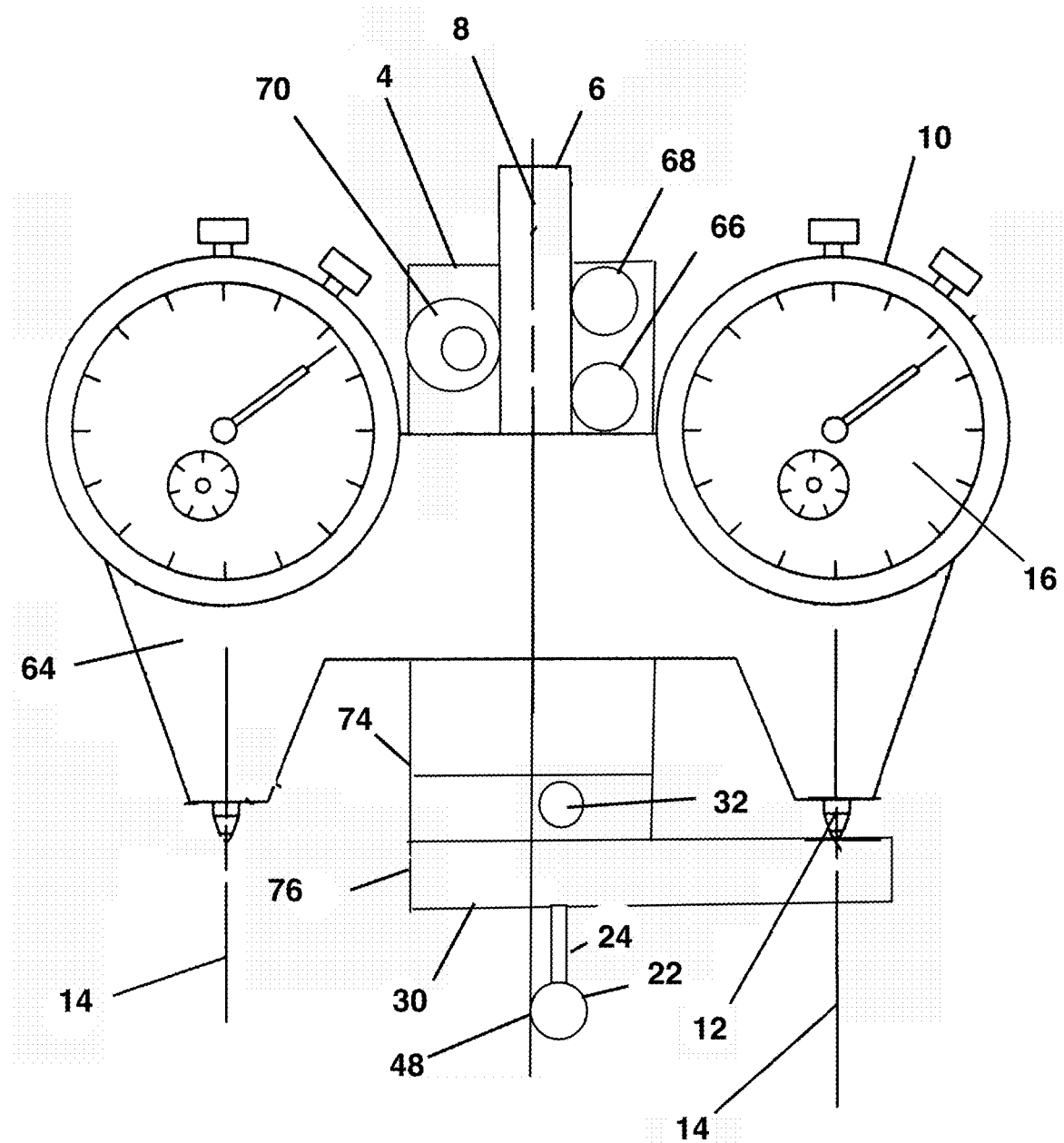
FIG. 13 is a front view of the edge finder attached to a squaring apparatus.
Figure 14:
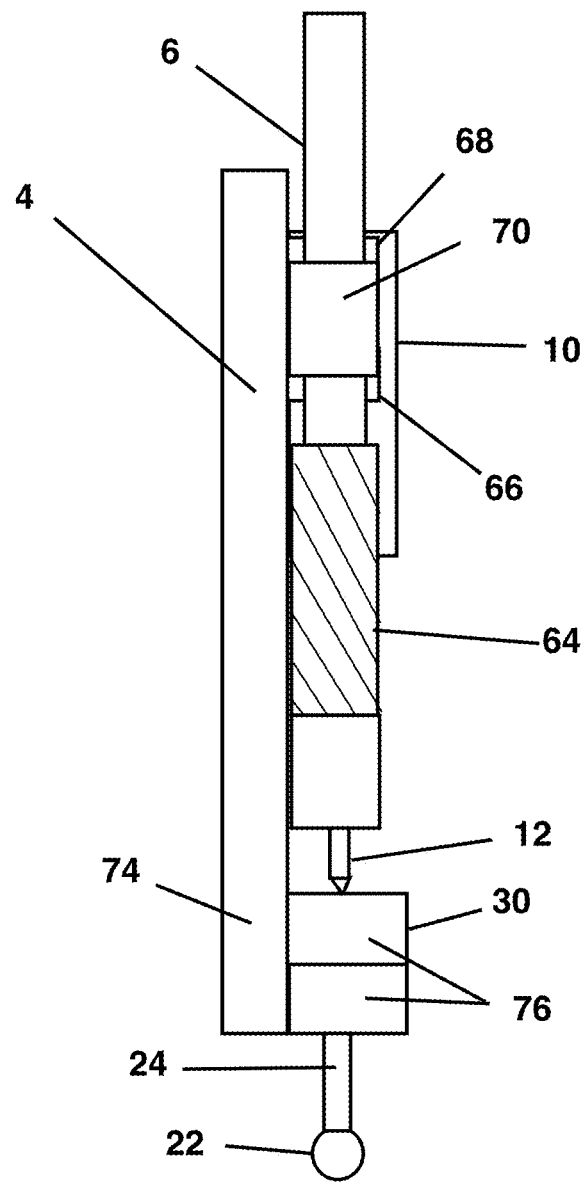
FIG. 14 is a side view of the edge finder attached to a squaring apparatus.

FIGS. 13 and 14 illustrate the edge finder 2 attached to a squaring apparatus 64. FIG. 13 is a front view and FIG. 14 is a side view with the squaring apparatus 64 partially cut away. From FIGS. 13 and 14, the squaring apparatus 64 includes a pair of indicators 10 that measure distance based on the movement of one of the plungers 12 along the indicator axes of travel 14, which is parallel to the shank longitudinal axis 8. The indicators 10 are mounted to a squaring apparatus body 65 and are in a spaced apart relation with a shank 6. The shank 6 is used to attach the squaring apparatus 64 to the spindle of a machine tool, as described by U.S. Pat. Nos. 7,069,666 and 6,832,440.

The body 4 is attached to the shank 6 of the squaring apparatus 64 using first and second pins 6, 8 and cam clamp 70, as described above. When the edge finder 2 is attached to the squaring apparatus 64, lever 30 is configured to contact and depress plunger 12 of one of the indicators 10 as the lever 30 pivots about the hinge 32 in the manner described with respect to FIGS. 1 and 3.

The apparatus 2 may be attached to the squaring apparatus 64 and calibrated while the squaring apparatus 64 is attached to the spindle of the machine tool, providing additional convenience to the machinist and avoiding an opportunity for error in attaching and detaching the squaring apparatus 64 from the spindle.

The use of locating pins 66, 68 and cam clamp 70 has proven suitable in practice for locating the apparatus 2 with respect to the shank 6 of the squaring apparatus 64. Any other mechanism for securely, accurately and repeatably mounting one mechanical device to another with the degree of accuracy required to calibrate a machine tool may be used to connect the body 4 to the squaring apparatus 64, including without limitation pins, bolts, screws, a threaded connection between the body 4 and the squaring apparatus body 65, a slide connection between the squaring apparatus body 65 and the body 4, provision of mating reference surfaces on both the squaring apparatus body 65 and body 4, and providing a squaring apparatus shank 6 that extends through the squaring apparatus 64 and a mating hole to receive the squaring apparatus shank 6 defined by the body 4.

While providing two calibration surfaces 74, 76 that align the probe contact location with the shank longitudinal axis 8 when the two calibration surfaces 74, 76 are coplanar has proven suitable in practice, any other mechanism to repeatably and accurately locate two mutually rotatable parts with respect to each other is contemplated by the invention. The calibration surfaces 74, 76 may be other than planar and may be any other shape that will mate with the reference calibration tool 78, which also may be other than planar. For example, the reference calibration tool 78 may be a pin and the pin may mate with holes penetrating both the body 4 and lever 30 that define the body calibration surface 74 and the lever calibration surface 76.

As used in this document, elements having similar function are shown and described in different drawings and the specification with the same element names and element numbers. Unless the context indicates otherwise, discussion and disclosure of an element number or name for one drawing applies equally to that name or element number appearing in relation to a different drawing.

The following is a list of numbered elements as used in the drawing, specification and claims.

2 edge finder
4 body
6 shank
8 shank longitudinal axis
10 indicator
12 plunger
14 plunger axis of travel
16 indicator face
18 bearing
20 indicator axis of rotation
22 locator probe
24 probe shaft
26 arc
28 bushing
30 lever
32 hinge
34 hinge pin
36 lever first end
38 lever second end
40 first side
42 second side
44 fasteners
46 set screw
48 locator probe contact location
50 calibration tool
52 reference surface
54 calibration surface
56 slider
58 line of travel
60 work piece
62 slider contact surface
64 squaring apparatus
65 squaring apparatus body
66 first locating pin
68 second locating pin 14
70 cam clamp
72 eccentric
74 body calibration surface
76 lever calibration surface 78 reference calibration surface
80 hinge axis of rotation

I claim:

1. An edge finder apparatus for aligning a work piece, a cutting tool or a work-holding feature to a spindle axis of rotation of a spindle of a machine tool, the edge finder apparatus comprising:
   a) a shank having a shank longitudinal axis, the shank being configured to be retained by the spindle so that the shank longitudinal axis is coextensive with the spindle axis of rotation;
   b) a body attached to the spindle;
   c) an indicator attached to and supported by the body, the indicator having a plunger, the plunger having an axis of travel, the axis of travel being generally parallel to the spindle longitudinal axis, the indicator being configured to indicate a movement of the plunger along its axis of travel;
   d) a lever, the lever having an end, the end of the lever defining a locator probe, the lever being configured to rotate about a hinge attached to the body, the lever being configured to move the plunger along the plunger axis of travel when the locator probe engages the work piece, cutting tool or work-holding feature.

2. The edge finder of claim 1 wherein the indicator has an indicator face, the indicator having a configuration for rotation about an indicator axis of rotation so that a user may rotate the indicator face and may read the indicator from more than one direction.

3. The edge finder of claim 2 wherein the configuration for rotation of the indicator face comprises: a bearing, the bearing being retained by the body, the indicator face being attached to the body by the bearing.

4. The edge finder of claim 3 wherein the indicator face axis of rotation coincides with the indicator axis of travel.

5. The edge finder of claim 1 wherein the lever end is a first lever end and wherein the lever defines a second lever end, the hinge being located intermediate to the first and second lever ends, the second lever end being configured to move the plunger in response to motion of the lever when the locator probe moves in response to contact by the work piece, cutting tool or work-holding feature.

6. The edge finder of claim 1 wherein the body comprises: a first side and a second side, the first and second sides being selectably attached one to the other, the first and second sides engaging the shank and securing the shank therebetween.

7. The edge finder of claim 6 wherein the hinge defines a pin, the lever being configured to rock about the pin, the pin having a pin first end and a pin second end, the pin first and second ends being trapped by the attachment of the body first and second sides so that the axis of rotation of the lever about the hinge is normal to a reference plane defined by the shank longitudinal axis and the plunger axis of travel.

8. The edge finder of claim 6 wherein the indicator has an indicator face, the indicator face having a configuration for rotation with respect to the body comprising: a bearing, the indicator face being attached to the body by the bearing, the bearing defining an indicator face axis of rotation, the indicator face axis of rotation being coextensive with the plunger axis of travel, the body first and second sides trapping the bearing so that the plunger axis of travel is parallel to the shank longitudinal axis.

9. A method of aligning a work piece, a cutting tool or a work-holding feature to a spindle axis of rotation of a spindle of a machine tool, the method comprising:
   a) providing an edge finder, the edge finder having a shank with a shank longitudinal axis, the edge finder having a body, the shank being retained by the body, the edge finder including an indicator attached to and supported by the body, the indicator having a plunger, the plunger having an axis of travel, the axis of travel being generally parallel to the spindle longitudinal axis, the indicator being configured to indicate a movement of the plunger along its axis of travel, the edge finder including a lever, the lever being supported by a hinge attached to the body, the lever having an end, the end of the lever defining a locator probe, the lever being configured to rock the lever about the hinge and to move the plunger along the plunger axis of travel when the locator probe touches the work piece, cutting tool or work-holding feature;
   b) releasably securing the shank to the spindle of the machine tool so that the shank longitudinal axis and the spindle axis of rotation are coextensive;
   c) moving the work piece, cutting tool or work-holding feature with respect to the spindle axis of rotation so that the work piece, cutting tool or work-holding feature contacts the locator probe and the indicator indicates a pre-determined value corresponding to alignment with the spindle axis of rotation.

10. The method of claim 9 wherein the step of providing the edge finder comprises: providing that the indicator has an indicator face, the indicator having a configuration for rotation about an indicator axis of rotation so that a user may rotate the indicator face and may read the indicator from more than one direction, the method further comprising: rotating the indicator face about the indicator axis of rotation to direct the indictor face toward the user so that the user may read the indicator face.

11. The method of claim 10 wherein the step of providing the edge finder further comprises: providing a bearing, the bearing being retained by the body, the indicator face being attached to the body by the bearing, the bearing defining the configuration for rotation of the indicator face.

12. The method of claim 10 wherein the step of providing the edge finder further comprises: providing that the indicator face axis of rotation coincides with the indicator axis of travel.

13. The method of claim 9 wherein the step of providing the edge finder further comprises: providing that the lever end is a first lever end and that the lever defines a second lever end, the hinge being located intermediate to the first and second lever ends, the second lever end being configured to move the plunger in response to motion of the lever when the contact location moves in response to contact by the work piece, cutting tool or work-holding feature.

14. The method of claim 9 wherein the step of providing the edge finder further comprises: providing that the body includes a first side and a second side, the first and second sides being selectably attached one to the other, the first and second sides engaging the shank and securing the shank therebetween.

15. The method of claim 14 wherein the step of providing the edge finder further comprise: providing that the hinge defines a pin, the lever being configured to rock about the pin, the pin having a pin first end and a pin second end, the pin first and second ends being trapped by the attachment of the body first and second sides so that the axis of rotation of the lever about the hinge is normal to a reference plane defined by the shank longitudinal axis and the plunger axis of travel.

16. The method of claim 14 wherein the step of providing the edge finder further comprises: providing that the indicator has an indicator face, the indicator face being attached to the body by a bearing, the bearing defining an indicator face axis of rotation, the indicator face being rotatable about the indicator face axis of rotation, the indicator face axis of rotation being coextensive with the plunger axis of travel, the body first and second sides trapping the bearing so that the plunger axis of travel is parallel to the shank longitudinal axis.

17. The method of claim 16, the method further comprising:
   a) providing a calibration tool, the calibration tool defining a reference surface, the reference surface being configured to engage a corresponding surface on the edge finder, the calibration surface being configured to intercept the shank longitudinal axis when the reference surface is in engagement with the corresponding surface on the edge finder;
   b) placing the reference surface in engagement with the corresponding surface on the edge finder so that the locator probe contact location intercepts the shank longitudinal axis;
   c) identifying a reading for the indicator face when the locator prove contact location intercepts the shank longitudinal axis.

18. The method of claim 17 wherein the step of identifying the reading for the indicator face comprises: setting the value displayed by the indicator at zero.

\* \* \* \* \*